(12) United States Patent
Huang et al.

(10) Patent No.: US 8,588,818 B2
(45) Date of Patent: Nov. 19, 2013

(54) LOCATION-BASED BROADCAST MESSAGING TO MOBILE DEVICES LOCATED IN OR ENTERING INTO A DEFINED GEOGRAPHIC AREA

(75) Inventors: Ye Huang, San Ramon, CA (US); Jerry Kupsh, Concord, CA (US); Hugh Fletcher, Mountain View, CA (US); Amir Mayblum, Walnut Creek, CA (US)

(73) Assignee: Cellco Partnership, Basking Ridge, NJ (US)

( * ) Notice: Subject to any disclaimer, the term of this patent is extended or adjusted under 35 U.S.C. 154(b) by 86 days.

(21) Appl. No.: 13/291,718

(22) Filed: Nov. 8, 2011

(65) Prior Publication Data
US 2013/0115872 A1    May 9, 2013

(51) Int. Cl.
*H04M 11/04* (2006.01)
*G08G 1/123* (2006.01)
*H04N 7/025* (2006.01)

(52) U.S. Cl.
USPC ............. 455/456.3; 455/404.1; 340/989; 725/33

(58) Field of Classification Search
USPC ............. 455/456.1, 404.1; 340/989, 501; 705/14.64, 14.66; 725/33
See application file for complete search history.

(56) References Cited

U.S. PATENT DOCUMENTS

| | | | |
|---|---|---|---|
| 5,724,316 A * | 3/1998 | Brunts | 368/10 |
| 6,745,021 B1 * | 6/2004 | Stevens | 455/404.1 |
| 2008/0291849 A1 * | 11/2008 | Ostermeier et al. | 370/270 |
| 2009/0174543 A1 * | 7/2009 | Lin | 340/501 |
| 2009/0291693 A1 * | 11/2009 | Kim et al. | 455/456.1 |
| 2010/0159943 A1 * | 6/2010 | Salmon | 455/456.1 |
| 2011/0088058 A1 * | 4/2011 | Velazquez et al. | 725/33 |

* cited by examiner

*Primary Examiner* — Nizar Sivji

(57) ABSTRACT

For a location-based broadcast messaging service, a broadcast server receives a broadcast request from a business application server. The broadcast request includes a message, at least one identifier for target mobile devices, and an identifier for a location. The broadcast server sends a location query including the identifier for the location to location agents associated with the target mobile devices. In response to receiving the location query, each location agent determines whether the location of the associated mobile device is within or otherwise satisfies a requirement related to the identified location. If the location of the device is within the identified location or satisfies the requirement, the location agent sends a query response to the broadcast server and receives, from the broadcast server, the message included in the broadcast request. The broadcast request can include a time-period identifier, such that the location agent determines the device location during the time-period.

24 Claims, 7 Drawing Sheets

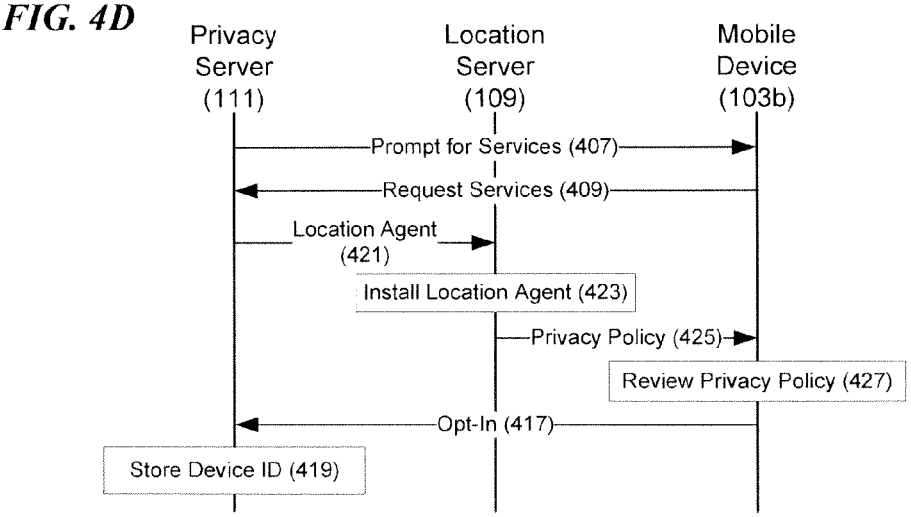
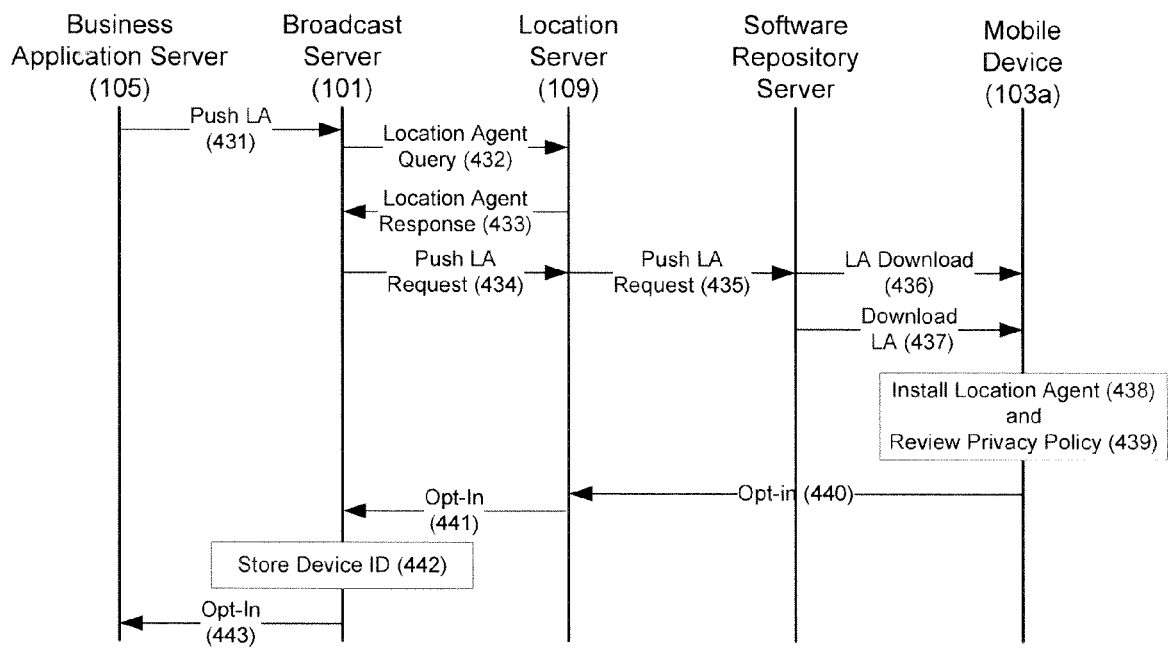

LOCATION-BASED BROADCAST MESSAGING TO MOBILE DEVICES LOCATED IN OR ENTERING INTO A DEFINED GEOGRAPHIC AREA

TECHNICAL FIELD

The present subject matter relates to techniques and equipment for a location-based broadcasting messaging service for broadcasting messages to mobile devices located in or entering into a defined geographic area.

BACKGROUND

In recent years, mobile communication services have expanded and increased in popularity around the world. Many advanced networks offer wireless mobile communication service for voice calls, mobile messaging services (e.g. text and/or multimedia) and data communications.

Broadcast messaging services, enabling the sending of mobile messaging service messages to large numbers of mobile devices, are increasingly used to send notifications to large numbers of subscribers. Examples of such notifications include advertisements, notices relating to users' accounts, and alerts. For example, subscribers to an alert system of a public transportation authority may receive mobile messaging service messages related to service disruptions for a particular subway line. Similarly, subscribers to a campus security alert system may receive mobile messaging service messages related to campus security alerts. In both cases, each mobile messaging service message is broadcast instantly to all subscribers of a particular messaging service. As a result, users subscribing to multiple mobile messaging service alert services are likely to be overwhelmed by large numbers of alerts on their mobile devices. Also, users who are not in the vicinity of a location associated with the alert, but who still subscribe to the alert service, will still receive all notifications even though the alerts are not currently relevant to them. A need therefore exists for a system that selectively provides to a user broadcast messages that that are relevant to the user, for example based on the user's location, profile and sender filtering criteria to send the messages to the mobile users.

An alert system for broadcasting mobile messaging service messages alerting users about imminent threats to life or property has been discussed for development. The proposed alert system is configured to send alert messages to all mobile devices located within an extended geographical area, such as the coverage area of multiple mobile base stations, and cannot limit the geographical area to a finer granularity. This alert system further is configured to send the alert message to all mobile devices located within the area, and therefore does not allow broadcast messages to be provided only to selected mobile devices. In order to ensure that mobile devices having entered an area have received the alert message, the alert system requires that the alert re-broadcast at regular intervals to all mobile devices located within the area. The inability to send the message to particular devices results in the messages being sent to all devices, thereby creating excessive network traffic and negatively affecting battery life on the devices.

A need therefore exists for a messaging service that allows broadcast messages to be sent only to devices located within geographical areas defined with a high-level of granularity. A need exists for a messaging service to send broadcast messages to selected mobile devices. A need further exists for a messaging service that identifies mobile devices having entered a geographical area, in order to send a broadcast message only to those mobile devices having entered the geographical area.

SUMMARY

The teachings herein alleviate one or more of the above noted problems by providing location-based broadcast messaging services to mobile devices. The examples in the drawings and detailed description enable mobile devices that are located within or otherwise satisfy a geographic location condition to receive a broadcast message.

A system for transmitting a message to mobile devices through a mobile traffic network includes a broadcast server and a privacy server. The broadcast server is in communication with a business application server through a communication network, and receives from the business application server a broadcast request including a message to be broadcast and one or more identifiers for a plurality of mobile devices. The privacy server is in communication with the broadcast server, and generates a list of confirmed mobile device identifiers in response to receiving a list of identifiers of mobile devices. In response to receiving the broadcast request, the broadcast server sends to the privacy server a list of identifiers of mobile devices corresponding to the one or more identifiers, and receives a list of confirmed identifiers from the privacy server. The broadcast server then sends a query to a location agent of each of the mobile devices identified in the list of confirmed identifiers received from the privacy server, receives a response to the query from at least one of the location agents, and transmits the broadcast message from the broadcast request to the mobile device associated with each location agent from which the broadcast server received a response to the query.

In one example, the broadcast request received from the business application server includes an identifier for a location, and the query sent to the location agent of each of the mobile devices includes the identifier for the location. In the example, the broadcast server is configured to receive the query response from at least one location agent upon a location of the mobile device associated with the at least one location agent satisfying a requirement related to the location identified in the broadcast request.

In accordance with a method of transmitting a message to mobile devices, the message is received with an identifier for a geographic location from a business application server intending to send the message. A list of identifiers for target mobile devices is also received. Using the list of identifiers for target mobile devices, a location query is sent to a location agent associated with each target mobile device, the location query including the identifier for the geographic location. Responses to the location query are received indicating which of the target mobile devices satisfy a requirement related to the identified geographic location, and the message received from the business application server is transmitted through a mobile traffic network to target mobile devices indicated as satisfying the requirement related to the identified geographic location. In one example, the method includes steps of receiving one or more identifiers for mobile devices from the business application server intending to send the message, and sending to a privacy server a list of mobile device identifiers corresponding to the one or more identifiers, such that the received list of identifiers for target mobile devices includes is received from the privacy server and includes a list of identifiers for mobile devices confirmed as having opted in to a broadcast messaging service, and such that the location query is sent to a location agent associated with each confirmed target mobile device included in the list received from the privacy server. In other examples, an indication of a time-period associated with the message is further received from the business application server, and the location query sent to location agents includes the indication of the time-period.

A location agent is disclosed including a non-transitory storage device, and programming in the storage device for execution by a processor. The programming configures the location agent to perform functions to receive a location query identifying a geographic location through a mobile traffic network from a broadcast server, determine a current location of a mobile device, and upon determining that the current location of the mobile device satisfies a requirement related to the identified geographic location, send a response message through the mobile traffic network to the broadcast server indicating that the mobile device satisfies the requirement related to the identified geographic location.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 4A, 4B, 4C, 4D, and 4E are signal flow timing diagrams showing communications between servers and devices of the exemplary system shown in FIG. 1 when confirming devices identifiers (FIG. 4A) and registering mobile devices (FIGS. 4B, 4C, 4D, and 4E) for location-based broadcast messaging services.

DETAILED DESCRIPTION

Figure 1A:
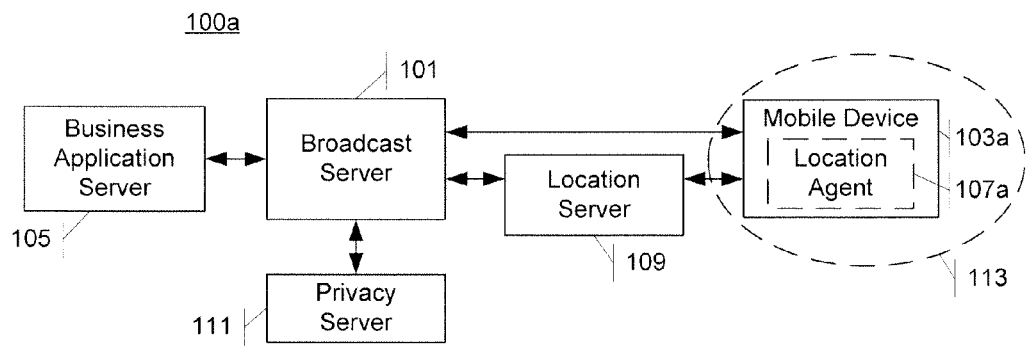
FIGS. 1A and 1B are general block diagrams of exemplary systems for providing location-based broadcast messaging services to a number of mobile devices.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various methods and systems disclosed herein relate to broadcast messaging services that provide location-based messaging to potentially large numbers of mobile devices. In particular, the service enables a user, such as a business, corporate, or other enterprise customer, to send a mobile messaging service message to selected mobile devices located within, entering into, and/or exiting from a particular geographical location ("geo-location") during a particular period of time. The user provides message contents, a list of identifiers for the target mobile devices (e.g., a list of target mobile device numbers (MDNs) identifying the devices), and an identification of the geo-location to a carrier-operated broadcast messaging server. The broadcast messaging server confirms that target mobile devices have opted into the messaging service.

The broadcast messaging server sends a location query to a location agent associated with each confirmed target mobile device. The location query includes an identifier for the geo-location. The location agent associated with each confirmed target mobile device determines whether the corresponding mobile device is located within or otherwise satisfies one or more requirements relating to the geo-location. Based on determining that the corresponding mobile device is located within the geo-location (or satisfies another requirement relating to the geo-location), the location agent sends a response message to the broadcast messaging server. Alternatively, based on determining that the mobile device enters the geo-location (or satisfies the requirement relating to the geo-location) during the particular period of time, the location agent sends a response message to the broadcast messaging server. Upon receiving the response message, the broadcast messaging server sends the broadcast message contents to the mobile device. The methods and systems are described in more detail with references to the accompanying drawings below.

A broadcast message, as defined herein, is a message having a common message content that is sent (or is intended to be sent) to a plurality of target devices, such as to a plurality of identified target devices meeting certain requirements. The broadcast message content can be sent to some or all of the target devices at the same time or at different times. The target devices can be identified in a list of target devices associated with the broadcast message. The requirements can include one or more location and/or time requirements. In one example, the broadcast message content is sent to all identified target devices that satisfy a location requirement at the beginning of a time-period requirement, and sent to all remaining identified target devices that satisfy the location requirement at a later time during the time-period.

The location-based broadcast messaging services can be used in a variety of contexts. For example, a hospital may need to page doctors located within a 30-mile radius of an emergency. The hospital may thus provide a message requesting emergency help from doctors, a list of doctors' mobile device numbers, and a geo-location defining a 30-mile radius around the emergency, in order to recruit doctors located near the emergency. Doctors located further from the emergency, and thus not available to respond to the emergency, would not be paged. In another example, a school may use the service to notify students located on or near school grounds of a security threat at the school. A traffic command center may advise drivers of its subscription base who are entering a city-center of a traffic shutdown in the city center. A store can provide a promotion coupon to those subscribers of its location-based broadcast messaging service who are located near one of its stores (or come to be located near one of its stores during the promotion period). A construction company may remotely disable heavy machinery equipped with mobile device receivers during a curfew period (e.g., 6 pm to 6 am), and/or based on location (e.g., to disable machinery that is not located in a worksite or a storage yard). The location-based broadcast messaging service can also be used in other applications requiring location-based and/or time-based messaging to potentially large numbers of mobile devices.

Figure 1B:
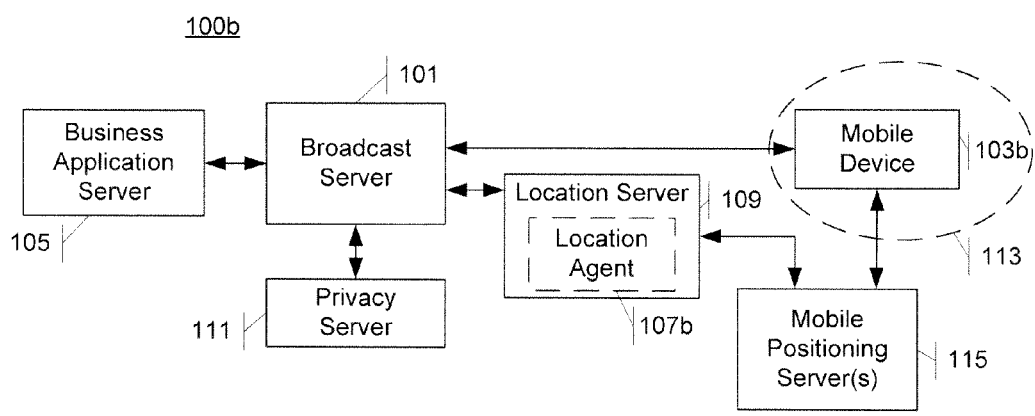

FIGS. 1A and 1B show block diagrams of systems 100a, 100b for providing location-based broadcast messaging services to a plurality of mobile devices 103a, 103b (referred generally as mobile device(s) 103). While a single mobile device 103 is illustratively shown in each of FIGS. 1A and 1B, each system 100a, 100b is more generally in communication with two or more mobile devices 103a and/or 103b. A user wanting to broadcast a mobile messaging service message to selected mobile devices 103a, 103b located in a particular geo-location sends a broadcast request to broadcast server 101. The user can use a business application server 105, in communication with the broadcast server 101, to send the request. The broadcast request includes message contents, a list of identifiers for target mobile devices, and information characterizing a geo-location 113. The information characterizing the geo-location 113 is information identifying the geographical location or area within which mobile devices are provided with the message contents, as well as information identifying the time-period during which the message should be provided. The geo-location 113 is described in greater detail in relation to FIG. 2A below.

Upon receiving the broadcast request, the broadcast server 101 confirms the privacy status of target mobile devices 103a, 103b identified in the broadcast request. In detail, the broadcast server 101 sends the list of identifiers for potential target mobile devices to a privacy server 111, and receives from the privacy server 111 a list of confirmed mobile device identifiers identifying those target mobile devices that have opted-in to the location-based broadcast messaging service.

Two different types of mobile devices 103a and 103b, and associated location agents 107a and 107b (referred to generally as location agent(s) 107), can be used to receive broadcast messaging services. Each type of mobile device 103a, 103b and location agent 107a, 107b is shown in a respective one of FIGS. 1A and 1B for ease of description and illustration. However various types of mobile devices 103a, 103b and locations agents 107a, 107b can be used together in either of systems 100a and 100b. In general, the location agent 107a is an application that is installed on and runs on the mobile device 103a. However, in some instances, the location agent 107b does not run on the mobile device 103b. For example, the location agent 107b may not run on the mobile device 103b if the mobile device does not have the ability or processing power to run a location agent application, if the mobile device does not have the ability to determine its location or run location-based applications, or if the mobile device operates on a different mobile carrier's network. In such instances, the location agent 107b for the mobile device 103b runs on a location server 109 associated with the mobile device 103b. A location server 109 can be associated with multiple mobile devices 103b, and run multiple location agents 107b such that each location agent 107b is associated with an associated one of the multiple mobile devices 103b. In general, a location agent 107 is associated with a single mobile device 103. However, in some examples, a location agent 107 may be associated with multiple mobile devices 103.

Regardless of whether the location agent 107a, 107b runs on the mobile device 103a or on a location server 109, the broadcast server 101 sends a geo-location query to a location server 109 associated with each confirmed mobile device 103a, 103b. In turn, the location server 109 forwards the geo-location query to the location agent 107a, 107b associated with each confirmed mobile device 103a, 103b. In one example, the location server 109 forwards the geo-location query to the location agent 107a running on mobile device 103a, while in another example, location server 109 forwards the query to the location agent 107b running on location server 109. The geo-location query includes the geo-location 113 information. Each location agent 107a, 107b determines whether the associated mobile device 103a, 103b is located within or otherwise satisfies one or more requirements relating to the area identified by the geo-location 113 during the time-period identified by the geo-location. For example, the requirements can specify determining whether the associated mobile device 103a, 103b enters or exits the area identified by the geo-location 113 during a define time-period. If so, the location agent 107a, 107b sends a geo-location response message to the broadcast server 101 and, in response to the geo-location response, the broadcast server 101 sends the broadcast message contents to the corresponding mobile device 103a, 103b.

Alternatively, if the location agent 107a, 107b determines that the associated mobile device 103a, 103b does not currently satisfy requirements relating to the area identified by the geo-location 113, the location agent monitors the mobile device's location for the duration of the time-period identified by the geo-location. If at any time during the time-period, the mobile device 103a, 103b is determined to satisfy requirements relating to the geo-location area, e.g. that the mobile device 103a, 103b is located within or is entering the area of the geo-location, the location agent 107a, 107b sends a geo-location response message to the broadcast server 101, and the mobile device 103a, 103b receives the broadcast message contents from the broadcast server 101.

The location agent 107 may determine the location of an associated mobile device 103 in one of several ways. A location agent 107, such as location agent 107a, may communicate directly with GPS or location-determining circuitry or software running on the mobile device 103 in order to determine the location of the mobile device 103, and/or determine whether the mobile device satisfies a requirement related to the geo-location 113. A location agent 107, such as location agent 107b, may alternatively or additionally communicate with one or more mobile positioning server(s) 115 to determine the location of the mobile device 103. The mobile positioning server(s) 115 may themselves be in communication with the mobile device 103, or with one or more servers of a mobile carrier network. In one example, the mobile positioning server(s) 115 may include a home location register (HLR) for identifying a mobile switching center (MSC) currently serving the mobile device 103, and include the serving MSC for acquiring an identification of a cell (cell ID) the mobile device 103 is located in. In such an example, the location agent 107 or location server 109 may be configured to translate the cell ID received from the serving MSC into geographic location coordinates (such as longitude and latitude), in order to determine the location of the mobile device 103.

In some instances, the location agent 107 may store records of one or more recent locations of the mobile device 103 in a cache memory, each record including a time-stamp of the time at which the mobile device 103 was at the location. In response to receiving a geo-location query, the location agent 107 may use the cached record of the mobile device location instead of determining a current or updated location of the mobile device. In particular, the location agent 107 may use the cached record if the time-stamp associated with the record is recent (e.g., the different between a current time and the time-stamp is less than a predetermined time-period).

Figure 2A:
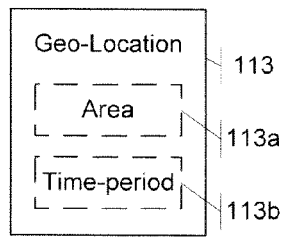
FIGS. 2A and 2B are block diagrams showing the elements characterizing a geo-location and a broadcast request, respectively, used to provide the location-based broadcast messaging service.

FIG. 2A shows a block diagram illustratively showing the elements characterizing a geo-location 113. The information characterizing the geo-location 113 includes identifiers characterizing a geographical area 113*a* and a time-period 113*b*. In general, the area 113*a* is a geographic location or area within which (or, alternatively, outside of which) mobile devices are provided with the broadcast message. For example, a boundary can include a point and a radius jointly describing a circular area; a series of points defining a polygon having an interior area; a series of line segments defining a polygon having an interior area; or any other series of identifiers for describing a geographic area. Alternatively or additionally, the area 113*a* corresponds to a boundary, fence, perimeter, or line segment, such that mobile devices crossing the boundary, perimeter, or line segment are provided with the broadcast message. For example, the area 113*a* can include a point and a radius jointly describing a circular perimeter; a pair of points defining a line segment; a series of points defining a polygonal perimeter; or other identifiers defining one or more boundaries or line segment(s). The area 113*a* can be composed of a combination of multiple geographic areas and/or boundaries, such as the union of a circular area and a polygonal area, or the intersection of two overlapping circular areas. The multiple areas and/or boundaries may overlap with each other, be adjacent, or be geographically separate in space. The area 113*a* can also specify an indicator of directionality. When associated with an area or a boundary defining a closed area, the indicator of directionality may identify an entering or exiting direction (e.g., entering a geo-location area; crossing of the perimeter of a circle in an outward/exiting direction). As described herein, a mobile device is found to satisfy a condition or requirement relating to a geo-location area 113*a* if the mobile device's location complies with the location criteria set-out by the geo-location area 113*a*. In particular, a mobile device may satisfy a requirement relating to an area 113*a* if the mobile device is located within the area, if the mobile device crosses a boundary associated with the area 113*a*, if the mobile device crosses the boundary in the specified direction associated with the area 113*a*, and/or if the mobile device's location satisfies any other requirement relating to or criteria associated with area 113*a*. The identifiers characterizing the geographical area 113*a* can include location coordinates, such as longitude and latitude coordinates, distance measurements from a geographic point or location, identifiers for cells or base transceivers in a cellular network (e.g., a cell ID), combinations thereof of such identifiers, or the like.

In general, the geo-location 113 can have an associated time-period 113*b*, which can be indicated as part of geo-location data. The time-period data defines one or more time intervals during which the geo-location is active and mobile devices should be provided with the broadcast message. The time-period can include a single time, such that mobile devices located within or otherwise satisfying a requirement relating to the geo-location at that time are provided with the broadcast message. The time-period can include a time-interval (specified by data including at least one start-time and one end-time), such that mobile devices satisfying one or more requirements relating to the geo-location at the beginning of the time-period are provided with the broadcast message, and any mobile devices satisfying any of the requirements relating to the geo-location during the time-period are provided with the broadcast message. The time-period data can indicate a particular day of (or interval during) the week, day of (or interval during) the month, or a date (or date interval) in addition to the time information. The time-period can be a recurring time-period (e.g., every day from 7 pm to 5 am). The time-period data can also include non-time identifiers such as "now" to indicate that the message should be sent at a current time (or as soon as possible after the current time), or delay identifiers such as "in 60 minutes" to indicate the message should be sent sixty minutes after the current time. Non-time identifiers may be accompanied by a time-stamp for the time at which the time-period data was generated, so as to measure the time-period identified by the non-time identifier with respect to the time-stamp. If no time-period information is provided, a default time-period can be used. The default time-period may cause the message to be sent out a single time, e.g., at a current time (or as soon as possible after the current time). The time-period can be composed of multiple times and/or time-intervals (e.g., from 6 am to 9 am and from 5 pm to 8 pm). Different time-periods can also be associated with different areas identified by the geo-location, for example in order to provide a location-based broadcast messaging notifications to mobile devices located in a first location between 9 am and 12 pm and to mobile devices located in a second location between 11 am and 2 pm. A mobile device is found to satisfy a requirement relating to geo-location 113 if the mobile device location satisfies the requirement relating to a geo-location area 113*a* criterion during a time-period set out by the geo-location time-period 113*b*.

The location-based aspect of the broadcast messaging service relies on determining a current location of each of the mobile devices 103. The determination of mobile device location can be performed using any one or more of a global positioning system (GPS); an assisted GPS positioning system; triangulation based on positions of and signals received from mobile base station(s); hybrid approaches based on a combination of GPS and triangulation; and/or any other appropriate methods for determining the location of the mobile device 103. In order to determine the mobile device location 103, the mobile device can include a GPS receiver and/or processor, for receiving signals from GPS satellites and/or determining a device location based on the received signals. The mobile device can additionally or alternatively include circuitry for performing triangulation, such as circuitry for measuring signal strength and/or signal delay from one or more base stations. Systems and circuitry for determining mobile device position can also be included in base stations and/or servers that are in communication with the mobile devices 103, such as location server 109 or mobile positioning server(s) 115. In one example, location server 109 includes circuitry for performing triangulation to determine the location of a mobile device, such as circuitry for measuring signal strength and/or signal delay of signals received from a mobile device 103*b* at one or more base stations. In another example, location server 109 receives device position information from mobile devices 103*b* associated with the location server 109. In yet another example, mobile positioning server(s) 115 include a HLR for identifying a MSC currently serving a mobile device 103, and a serving MSC server for acquiring an identification of a cell (cell ID) the mobile device 103 is located in. In such an example, the location server 109 or location agent 107 may be configured to translate the cell ID received from the serving MSC into geographic location coordinates (such as longitude and latitude), in order to determine the location of the mobile device 103.

Figure 2B:
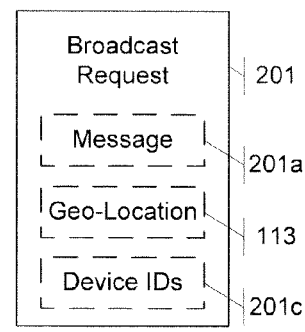

FIG. 2B shows a block diagram illustratively showing the components of a broadcast request 201, such as the broadcast request sent by business application server 105 to broadcast server 101 of FIG. 1. In general, the broadcast request 201 is a communication message that includes message content 201*a*, geo-location 113, and one or more identifiers 201*c* for mobile devices (device identifiers, or device IDs). The broadcast request 201 can also include other information, such as an identifier for the user making/initiating/sending the request (i.e., the request initiator), and/or a password or other security identifier associated with the user making the request. The message content 201*a* includes the message intended to be broadcast, and is generally content of an appropriate type for a mobile messaging service message, such as for a short message service (SMS) message, for an enhanced messaging service (EMS) message, for a multimedia messaging service (MMS) message, and/or for an IP push mobile message.

The message content 201*a* can additionally or alternatively include other appropriate types of content that should be provided to the mobile device. In one such further example, the message content may include control data to deactivate or disable machinery located within the area corresponding to the geo-location information. A piece of machinery having an ignition system controlled by a mobile device can thus have its ignition system disabled by the mobile device in response to the mobile device receiving broadcast message content control data to disable the ignition system. As a result, an owner of the machinery can ensure that the machinery is automatically disabled when not located within a work site (e.g., if the machinery is stolen, or if the machinery is in transit to/from a worksite). In another example, the message content includes a command to send a notification or message to the request initiator if a device crosses a geo-location boundary. As such, a mobile device controlling the ignition system of a piece of machinery can receive a command to send a notification or message from the mobile device to an owner of the machinery (or other request initiator). The notification of message may include device location information and/or device status information (enabled/disabled).

The geo-location 113 includes an identification of an area 113*a* and information indicating an applicable time-period 113*b* for determining one or more requirements relating to the geo-location 113 associated with the broadcast request. The broadcast request can either include the full area 113*a* and time-period 113*b* information, or include one or more identifier(s) for a pre-defined area, requirement related to an area, or time-period. The area information can thus include identifier(s) for, e.g., a pre-defined area identified as "Greater San Francisco metro area" and corresponding to an area encompassing the metropolitan area of the city of San Francisco and surrounding cities. The time-period information can include identifiers for, e.g., a pre-defined time-period identified as "Morning rush-hour" and corresponding to a time-period for a current (or subsequent) rush-hour period such as a period from 5 am to 9:30 am on a weekday. The pre-defined identifiers and associated areas and/or time-period indicators are generally defined before the broadcast request 201 is received by the broadcast server 101. The identifiers can be defined by an administrator of the broadcast server 101, by an administrator or user of the business application server 105, or by another appropriate person or entity. Once they are defined, the pre-defined identifiers and associated areas and/or time-period indicators can be stored on the broadcast server 101, or on a server in communication with the broadcast server 101. When a broadcast request including an identifier is received in the broadcast server 101, the area, requirements related to the area, and/or time-period associated with the identifier are retrieved from storage for use in broadcasting the message content.

The one or more identifiers 201*c* for mobile devices is a list of mobile device identifiers (IDs), or an identifier for a list of mobile device identifiers. The list of mobile device IDs includes identifiers for at least two target mobile devices that should be provided with the message content information if the mobile devices satisfy the geo-location location and time requirements. Generally, the list of mobile device IDs includes a list of mobile directory numbers (MDNs), mobile identification numbers (MINs), international mobile subscriber identity numbers (IMSIs), or other identifiers for uniquely identifying target mobile devices. The one or more identifiers 201*c* can alternatively be an identifier for a pre-defined distribution list of target mobile devices that is stored on or accessible from the broadcast server 101. For example, a "device IDs" identifier 201*c* of the broadcast request 201 can be an identifier for a distribution list (e.g., "XYZ Corporation employee broadcast distribution list" for a corporation; "frequent shopper list" for a particular merchant; or the like), such that the broadcast server 101 can retrieve from a storage a list of target mobile device identifiers corresponding to the identifier. The pre-defined distribution list can be provided in advance by a user of the system, by a system administrator, or any other appropriate entity.

In some examples, broadcast request 201 can include additional information or components. Broadcast request 201 can include an indicator of broadcast message priority. The indicator of broadcast message priority can be used by the broadcast server 101, the location server 109, and/or the location agent 107 to determine whether any message should be preferentially or more promptly processed by the system. For example, a broadcast message having a time-sensitive content may be given a high priority, to ensure that the message is preferentially processed by the server(s), agent(s), and mobile device(s) such that the message may be provided to mobile devices promptly or with minimum delay. A broadcast message having high priority can include a public safety message, such as a message reporting an imminent threat to safety or security. A broadcast message having a lower priority, in contrast, may be processed by the server(s), agent(s), and mobile device(s) only after all high priority message have been processed. The indicator of message priority may be provided to the broadcast and location servers to ensure that the servers preferentially process high-priority messages. The indicator of message priority may also be included with the geo-location information 113 provided to location agents 107, such that the agents preferentially process high-priority messages. In situations in which the location of a mobile device is periodically, the indicator of message priority may also be used to determine the time-period on which monitoring is performed. In one example, a location agent 107 may frequently monitor the location of a mobile device 103 when a high-priority geo-location query is received (e.g., by monitoring the location of the mobile device 103 every minute, or other short time-period), while the location agent 107 may monitor the location less frequently when a lower priority query is received (e.g., by monitoring the location every 10 minutes, or other longer time-period).

Figure 3A:
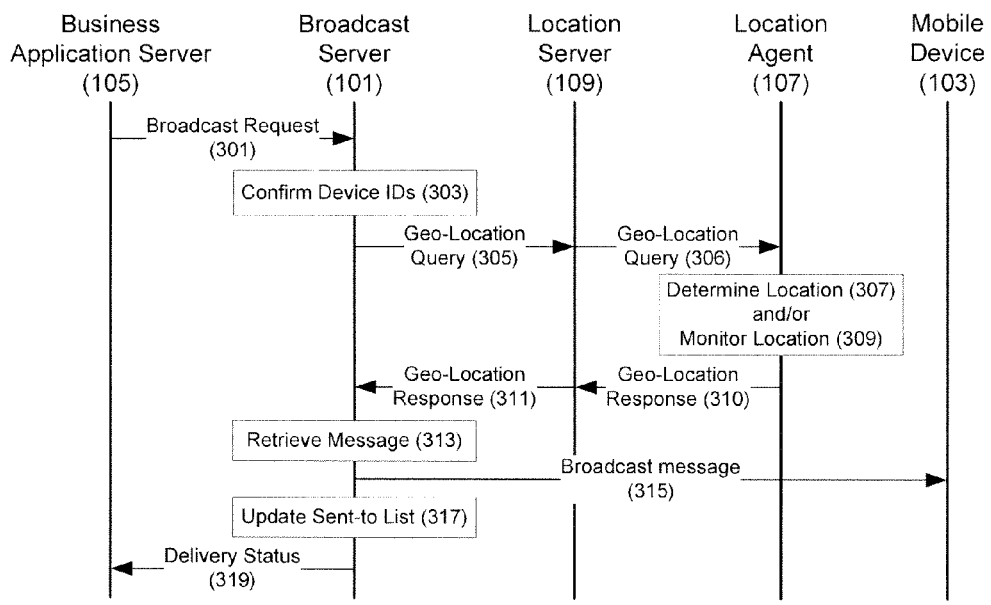
FIGS. 3A and 3B are signal flow timing diagrams showing communications between servers and devices of the exemplary system shown in FIG. 1 when providing location-based broadcast messaging services to mobile devices.
Figure 3B:
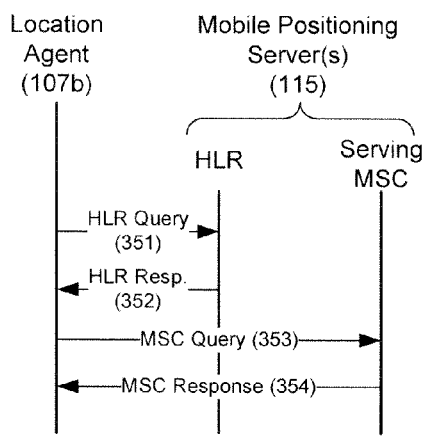

The communications and signaling between systems involved in providing the location-based broadcast messaging services will now be described in more detail with reference to FIGS. 3A and 3B. FIGS. 3A and 3B show signal flow timing diagrams showing the communication messages exchanged between business application server 105, broadcast server 101, location server 109, location agent 107, and mobile device 103.

The location-based broadcast messaging service is initiated by the business application server 105 at step 301, when the business application server 105 sends a broadcast request 201 to the broadcast server 101. The broadcast request 201 includes broadcast request message content 201*a*, geo-location 201*b*, and one or more identifiers 201*c* for target mobile devices. The broadcast request 201 can be sent to the broadcast server 101 as a mobile messaging service message, as a packet-data message, or by any other appropriate means. The broadcast request 201 can be generated and provided to the broadcast server 101 using an application programming interface (API) running on business application server 105, using a web-portal provided by a network carrier or administrator of the broadcast server 101, or using other appropriate means.

Upon receiving the broadcast request 201, broadcast server 101 proceeds at step 303 to confirm the target mobile devices identified in the broadcast request 201. As described in relation to FIG. 2B, the target mobile devices are identified by one or more identifiers 201*c* included in the broadcast request, the one or more identifiers 201*c* including a list of mobile device IDs or an identifier for a list of mobile device identifiers. The confirmation can include one or more of confirming whether the target mobile devices corresponding to the mobile device identifiers of the list are registered for the location-based broadcast messaging services, run or have associated location agents for providing the messaging service, have accepted or opted-in to a privacy policy associated with the messaging service, and/or have accepted or opted-in to receiving broadcast messages from the request initiator. In general, the confirmation of target mobile devices or their identifiers includes the broadcast server 101 sending to the privacy server 111 the list of target mobile device IDs identified in the broadcast request, and receiving in response a list of confirmed mobile device IDs identifying, among the target mobile device IDs, those mobile device IDs corresponding to mobile devices that have opted-in to the privacy policy associated with the messaging server. The confirmation performed at step 303 is described in further detail in relation to FIG. 4A below. Upon completing the confirmation, the broadcast server 101 has access to a list of confirmed mobile device IDs. In one example, however, the broadcast server 101 and the privacy server 111 may be a single server, and all of the operations described herein as being performed by the privacy server 111 may instead by performed by the broadcast server 101 itself. In the example, broadcast server 101 may maintain a local database in memory storing mobile device identifiers of mobile devices having accepted or opted-in to the location-based broadcast messaging service and to the associated privacy policy.

Following the confirmation of target device IDs, the broadcast server 101 sends a geo-location query message via the location server 109 to the location agent 107 of each mobile device included in the list of confirmed mobile device IDs (steps 305, 306). The geo-location query is generally (but not necessarily) sent only to the location agents 107 of devices included in the confirmed list. The geo-location query message includes the geo-location information, including the identifiers for the area and the associated time-period characterizing the geo-location received by the broadcast server 101 in the broadcast request at step 301. The geo-location query message also includes a unique identifier associated with the broadcast request. In the case of mobile devices 103*a* that run their own associated location agents 107*a*, the geo-location query 305, 306 is transmitted to the location agent 107*a* running on the mobile device 103*a*. In the case of mobiles devices 103*b* that do not run their own associated location agents 107*b*, the geo-location query 305, 306 is transmitted to the location agent 107*b* associated with the mobile device 103*b* and running on a corresponding location server 109.

In response to receiving the geo-location query, each location agent 107 retrieves the time-period information contained in the geo-location query 306. If the time-period spans or includes the current time, the location agent 107 determines the current location of the associated mobile device (step 307) and compares the current location to the geo-location area information. If the location agent determines that the mobile device is within or otherwise satisfies a requirement related to the geo-location area, the location agent immediately sends a geo-location response message to the broadcast server via the location server (steps 310, 311). The geo-location response message generally includes an identifier for the particular location agent 107 and/or for the particular mobile device 103 associated with the location agent 107, as well as the identifier included in the geo-location query message and associated with the broadcast request. The geo-location response message optionally includes location information identifying the current location of the mobile device 103 associated with the location agent 107. If the location agent 107 determines that the mobile device 103 is not currently within or does not currently satisfy a requirement related to the geo-location area, the location agent stores the geo-location query information and monitors the location of the mobile device for the remaining duration of the time-period (step 309) associated with the geo-location. If the mobile device 103 is determined to be within or to satisfy a requirement related to the geo-location area at any time during the time-period, the geo-location response message is generated and sent to the location server via the broadcast server (steps 310, 311).

In the location determination and monitoring (steps 307, 309) is performed by the location agent 107. In embodiments in which the location agent 107*a* runs on the mobile device 103*a*, the location determination and monitoring can include communicating with a GPS or locator module of the mobile device 103*a* in order to obtain location information. In embodiments in which the location agent 107*b* runs on a location server 109, however, the location determination and monitoring may rely on one or more mobile positioning server(s). In an example shown in FIG. 3B, the location agent 107*b* sends a HLR query message (step 351) to a home location register (HLR) in order to determine a current location of the mobile device 103*b*. The HLR query can identify the mobile device 103*b* whose location is requested, for example by including an identifier such as a MDN, MIN, or the like. In response to the HLR query, the HLR may send a response message (step 352) identifying a mobile switching center (MSC) currently serving the mobile device 103*b*. The location agent 107*b* may then send a MSC query message (step 353) identifying the mobile device to the serving MSC and, in response to the query, receive from a MSC response message (step 354) including a cell ID identifying a carrier network cell including the mobile device 103*b*, or identifying a base transceiver station (BTS) having the mobile device 103*b* in range. The location agent 107*b* may then use the received cell ID information to determine the location of the mobile device, for example by calculating approximate longitude and latitude coordinates for the device based on the cell ID information. The location agent may perform steps 351-353 to determine the location of the mobile device 103*b* (e.g., during step 307), and/or may periodically repeat the steps when monitoring the location of the mobile device (e.g., during step 309).

In response to receiving the geo-location query (step 306), each location agent 107 may determine whether a requirement relating to the geo-location 113 specifies determining whether an associated mobile device 103 enters or exits the area identified by the geo-location. If no such requirement is specified, the location agent 107 may only need to determine and/or monitor a current location of the associated mobile device 103 at steps 307 and 309. However, if such a requirement is specified, the location agent may need to determine and/or monitor both a previous and a current location of the associated mobile device 103. To this extent, the location agent 107 may determine a location of the mobile device, for example at the beginning of a time-period associated with the requirement, and may store the determined location as a "previous" location in a memory of the mobile device. The location agent 107 may store further locations as "previous" locations in the memory, and use a determined current location of the mobile device as well as one or more previous locations of the mobile device to determine whether the requirement relating to the geo-location is satisfied at any time during a time-period associated with the requirement. Alternatively, the location agent 107 may monitor a location of the mobile device during the time-period, and may cause a "previous" location flag to be set in a memory of the location agent when the location agent determines that the mobile device is outside of the area identified by the geo-location and the requirement is one for entering the area (or, conversely, the flag is set when the mobile device is inside of the area and the requirement is one for exiting the area). After the "previous" location flag is set, the location agent may determine that the requirement is satisfied when the location agent determines that the mobile device is within the area identified by the geo-location and the flag is set (or, conversely, when the mobile device is determined to the outside of the area, if the requirement is one for exiting the area). The "previous" location flag is thus set based on a determination of a previous location of the mobile device, and serves as an identifier for a previous location of the mobile device.

In general, when the mobile device 103 is first determined to be within or to satisfy a requirement related to the geo-location, or when the geo-location time-period expires (whichever occurs first), the location agent 107 erases the geo-location query information from memory and stops monitoring the location of the mobile device 103 with respect to the geo-location query. As such, the mobile device 103 receives the broadcast message associated with the geo-location query at most a single time. In an alternate example, the location agent 107 flags the geo-location query information as satisfied in the memory when the geo-location requirement is satisfied. The flag may indicate a time or location of the mobile device 103, or an area the mobile device 103 was within, at the time the geo-location requirement is satisfied. The location agent 107 can then use the flag information to determine when and/or where the broadcast message was previously provided to the mobile device, and can optionally re-deliver the message to the same mobile device at a different time or location. For example, the message may be re-delivered at later time(s) if a time-period associated with the geo-location is long (e.g., exceeds several hours, days, or weeks) or includes multiple intervals, or re-delivered in different location(s) if an area associated with the geo-location includes an expansive area or multiple separate areas. In the example, the mobile device 103 may receive the broadcast message associated with the geo-location query multiple times.

If the time-period associated with the geo-location does not span or include the current time, and the time-period includes a future time, the location agent 107 stores the geo-location query information. The location agent 107 then monitors the location of the mobile device with respect to the stored geo-location boundary information for the duration of the time-period (step 309), as described above. A mobile device may store multiple geo-location queries, and/or may monitor the device's location with respect to multiple geo-location queries at the same time. The monitoring of the device's location can be performed continuously. However, the location monitoring is more commonly performed on a periodic interval (e.g., at 1 minute intervals). The periodic interval can be the same for all location agents or mobile devices, can be agent or device dependent (e.g., location agents running on mobile devices may monitor on a short interval, such as a 1 minute interval, while agents running on location servers may monitor on longer intervals, such as a 5 minute interval), or can be dependent on the geo-location query and/or broadcast request. For example, a geo-location query or a broadcast request may specify a monitoring interval, or specify a message type or alert level used by the broadcast server or the location agent in setting the monitoring interval.

As described in the previous paragraphs, if the mobile device is determined to be within or to satisfy a requirement related to the geo-location at any time during the associated time-period, the geo-location response message is generated by the location agent 107 and transmitted to the broadcast server 101 (steps 310, 311). The geo-location response message is thus generally (but not necessarily) only sent during the time-period associated with the geo-location. The geo-location response message generally includes an identifier for the mobile device and/or for the associated location agent 107, as well as the identifier associated with the broadcast request and included as part of the geo-location query message. In response to receiving a geo-location response message from a location agent 107, the broadcast server 101 retrieves the message content associated with the broadcast request identified in the response message (step 313) and transmits the message content to the mobile device 103 identified in or associated with the location agent identified in the response message (step 315). The message content is generally transmitted to the mobile device 103 as a mobile messaging service message, or as another appropriate type of message or transmission based on the type of message content included in the broadcast request.

While steps 305 through 315 are described above with respect to an exemplary location agent 107, the steps are performed on or with respect to the location agents of all mobile devices included in the list of confirmed mobile device IDs obtained at step 303.

The broadcast server 101 optionally keeps track of mobile devices that a broadcast message is sent to in a "Sent-to" list. At the time of sending the broadcast message (step 315), the broadcast server 101 can update the "Sent-to" list (step 317) to include the mobile device identifier of the mobile device 103 the broadcast message content was sent to. In situations in which the geo-location response message includes an identifier for the location of a mobile device, the "Sent-to" list can also store the identifier for the location of the mobile device.

The broadcast server 101 provides the business application server 105 having made the broadcast request with delivery status information of the broadcast message at step 319. The delivery status information can be sent immediately following the sending of the broadcast message contents to a mobile device (step 315) and can identify the mobile device the broadcast message contents were sent to. Alternatively, the delivery status information can be sent to the business application server 105 on a periodic basis (e.g., every 30 minutes) or after the end of the time-period associated with the broadcast request, and can either identify all mobile devices that the broadcast message was sent to (i.e., include the entire "Sent-to" list) or identify all mobile devices that the broadcast message was sent to since the last delivery status information message was sent.

In general, the geo-location response message is sent to the broadcast server via the location server at steps 310, 311 only if the mobile device is determined to be within, or to satisfy a requirement related to, the geo-location. In another example however, the location agent may be configured to provide a response message to the broadcast server even if the mobile device does not satisfy any requirement. The response message may include status information for the mobile device, such as an indication of whether the mobile device is powered on, whether the location agent can determine the location of the mobile device, or the like. In such an example, the broadcast server may provide device status information to the business application server for all identified mobile devices as part of the delivery status message.

Various steps may be added to, removed from, reordered, or substituted from the timing diagram of FIG. 3. For example, step 315 may be accompanied or replaced by a step involving the broadcast server sending a message to a device or server other than the mobile device associated with the mobile agent involved in steps 305-311. In one instance, step 315 may involve sending a message to a server to alert the server that the mobile device associated with the mobile agent involved in steps 305-311 has satisfied the geo-location. For example, step 315 may involve sending a message to a machinery dispatching center to alert the machinery dispatching center that a mobile device installed in a piece of heavy machinery has exited a geo-location defining a secure boundary around a construction site. In response to the alert, an operator of the machinery dispatching center may verify whether the piece of heavy machinery is permitted to cross the secure boundary, and contact law enforcement officials if needed.

Figure 4A:
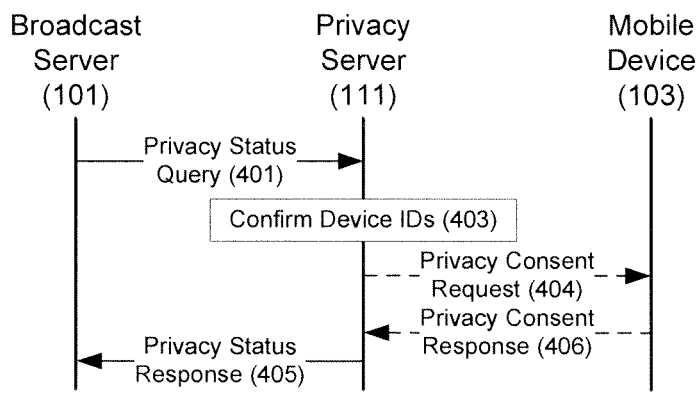

FIG. 4A is a signal flow timing diagram showing the communication messages exchanged between broadcast server 101 and privacy server 111 during the confirmation of target device IDs. As described in relation to step 303 of FIG. 3 above, the broadcast server may need to confirm whether one or more target mobile device (and/or associated mobile device identifiers) have opted-in to a location-based broadcast messaging service, and may rely on privacy server 111 to perform the confirmation. The process steps shown in FIG. 4A can be initiated when the broadcast server 101 receives a broadcast request including a list of target mobile device identifiers or an identifier for a list of mobile device identifiers, for example at step 301 of FIG. 3. Additionally or alternatively, the process may be initiated when the broadcast server 101 receives a list of target device IDs, for example upon receiving a pre-defined distribution list of target mobile devices for future use by the broadcast server 101.

Following receipt of a list of target mobile device identifiers (or an identifier for a list of mobile device identifiers), the broadcast server 101 sends a privacy status query to the privacy server 111 at step 401. The privacy status query includes the received list of target mobile device identifiers, or the list of target mobile device identifiers associated with the received identifier. In response to receiving the query, the privacy server confirms the device identifiers by determining, for each listed device identifier, whether the associated mobile device has accepted or opted-in to the privacy policy associated with the location-based broadcast messaging service (step 403). To this end, the privacy server maintains a database in memory storing mobile device identifiers of mobile devices having accepted or opted-in to the location-based broadcast messaging service and to the associated privacy policy. The privacy server thus generates a list of confirmed mobile device identifiers which includes target mobile device identifiers that match an identifier stored in the database. The privacy server database, a broadcast server database, or another server or storage location accessible by the broadcast server may include additional information relating to each stored device identifier, such as an indication of whether the associated mobile device has a location agent installed thereon, whether the associated device relies on a location agent running on a location server, and/or an address for the location agent running on a location server and associated with the device. In one example, the list of confirmed mobile device identifiers includes, in association with each confirmed identifier, the address of the location agent associated with the corresponding mobile device.

Once the privacy server 111 has assembled the list of confirmed device identifiers, the privacy server 111 generates and sends to the broadcast server a privacy status response message including the list of confirmed mobile device identifiers (step 405). In situations in which the broadcast server 101 sent the privacy status query message in response to having received a broadcast request, the broadcast server proceeds to send a geo-location query to each mobile device (and/or each associated location server/agent) identified in the list of confirmed device identifiers (see, e.g., step 305 of FIG. 3). In situations in which the privacy status query was sent in response to receiving a pre-defined distribution list, the broadcast server may store for future use the received list of confirmed identifiers with an identifier for the list in a storage for pre-defined distribution list.

As part of the confirmation of device IDs performed at step 403, the privacy server 111 may perform additional steps to obtain the consent of mobile device to the privacy policy. In particular, the privacy server may, in response to receiving the list of confirmed mobile device IDs, compile a list including mobile device IDs included in the list of target IDs identified in the broadcast request and not included in the list of confirmed mobile device IDs. The privacy server 111 may send, to each mobile device 103 associated with one of the mobile device IDs included in the compiled list, a location privacy consent request message (step 404) to determine whether a user of the mobile device 103 wants to receive the broadcast message. If the privacy server 111 receives a response message (step 406) indicating that the user(s) of one or more mobile device(s) 103 accept the privacy consent, the privacy server 111 may include the device IDs for the one or more mobile device(s) in the list of confirmed mobile device IDs. As a result, the broadcast server 101 may send the geo-location query to each of the one or more mobile device(s) 103 at step 305.

Figure 4B:
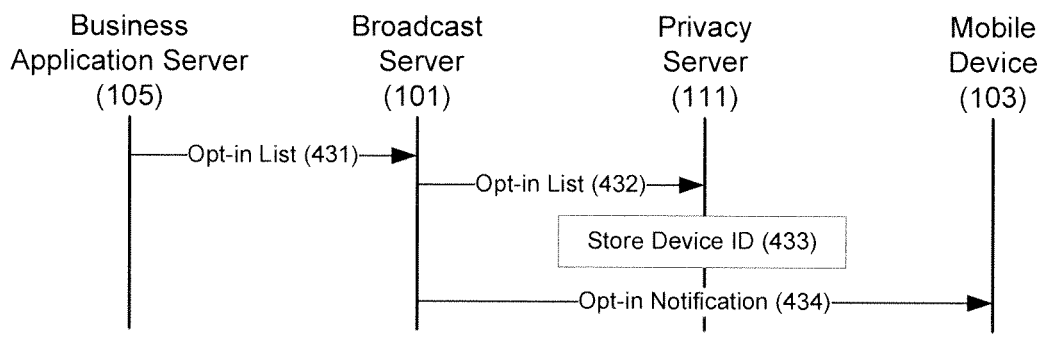
Figure 4C:
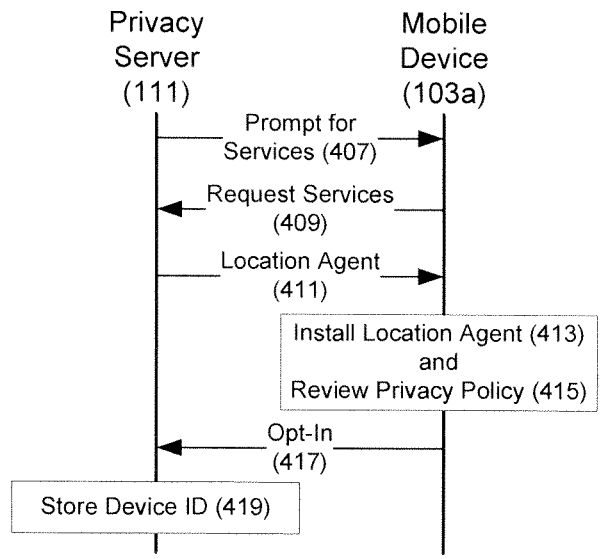

FIGS. 4B, 4C, 4D, and 4E are signal flow timing diagrams showing the communication messages exchanged between business application server 105, broadcast server 101, privacy server 111, mobile device 103, and optionally location server 109, during the registration of a mobile device for a location-based broadcast messaging service. FIG. 4B shows the registration process for a mobile device 103 having its device ID registered without consent. FIG. 4C shows the registration process with consent for a mobile device 103a that is capable of running a location agent 107a, while FIG. 4D shows the registration process with consent for a mobile device 103b that relies on a location server 109 to run a location agent 107b. FIG. 4E shows the push-installation of a location agent 107 on a mobile device 103.

The process shown in FIG. 4B is generally performed to add a device identifier for a mobile device 103 in a database of identifiers for mobile devices having opted-in to location-based broadcast messaging services on the privacy server 111. The process of FIG. 4B can, for example, be performed in the case of mobile devices 103 which do not require a prompt for opting-in to location-based messaging services. Such devices may include devices owned or controlled by a business or corporate user, and for which the business or corporate user provides consent for location-based messaging services to be used on the mobile device. As a result, a user of the device 103 may not be presented with the option to opt-in to location-based messaging services. In accordance with the procedure of FIG. 4B, the broadcast server 101 receives from the business application server 105 an opt-in message including a list of one or more identifiers for mobile devices 103 controlled by a business customer (step 431). In response to receiving the opt-in list, the broadcast server sends the opt-in list to the privacy server 111 (step 432), and the privacy server 111 stores the device identifiers included in the opt-in list in the database of identifiers for mobile devices having opted-in to location-based broadcast messaging services (step 433). In addition, the broadcast server 101 may send to each mobile device 103 identified in the opt-in list an opt-in notification, in order to inform a user of the mobile device 103 that the device is registered for location-based broadcast messaging services (step 434). The opt-in notification can be sent to the mobile device either directly from the broadcast server (as shown in FIG. 4B), or via one or more intermediary servers such as the location server 109.

The processes illustratively shown in FIGS. 4C and 4D are generally performed prior to receiving any broadcasting message on the mobile device 103a, 103b. For example, the processes can be performed upon receiving a user-initiated request from the mobile device to register for location-based broadcast messaging services. Alternatively, the processes can be initiated by the privacy server 111, for example upon determining that a mobile device identified in a privacy status query received by the privacy server 111 is not registered or configured for broadcast messaging services.

In FIG. 4C, the process begins with the privacy server 111 sending a prompt for location-based messaging services to the mobile device 103a (step 407). The prompt may cause a user of the mobile device to be presented with an option to enable and/or install location-based messaging services on the mobile device. If the user agrees to enable and/or install the services, the mobile device 103a sends a request for services to the privacy server 111 at step 409. In response to receiving the request for location-based broadcast messaging services from the mobile device 103a, the privacy server transmits a location agent installation file to the mobile device 103a at step 411. Alternatively, the privacy server 111 may instruct the mobile device 103a to download the location agent installation file from a repository server in step 411, or the privacy server 111 may cause a repository server to transmit the location agent installation file to the mobile device 103a in step 411. The mobile device 103a installs the location agent (step 413) and, as part of the installation, displays for review to the user of the device a privacy policy (step 415). If the user reviews and accepts the privacy policy, the mobile device 103a sends an opt-in message to the privacy server 111 at step 417. Upon receipt of the opt-in message, the privacy server 111 stores the device identifier of the mobile device 103a in the database of identifiers for mobile devices having opted-in to location-based broadcast messaging services and to the associated privacy policy (step 419). While the flow diagram of FIG. 4C shows privacy server 111 communicating directly with mobile device 103, the communications between privacy server 111 and mobile device 103 may be routed through one or more intermediary servers, such as broadcast server 101 and location server 109.

In FIG. 4D, the first steps of sending a prompt (step 407) and receiving a request for services (step 409) are performed by the privacy server 411 with respect to the mobile device 103b, as described above in relation to FIG. 4C. In response to receiving the request for location-based broadcast messaging services from the mobile device 103b, the privacy server 111 proceeds to transmit a location agent installation file to the location server 109 associated with the mobile device 103b (step 421). The location server 109 installs the location agent 107b at step 423. As part of the installation, the location server 109 sends the privacy policy included in the location agent installation file to the mobile device 103b for display to the user (step 425). If the user reviews and accepts the privacy policy (step 427), the mobile device 103b sends an opt-in message to the privacy server 111 at step 417. The opt-in message can, optionally, be sent from the mobile device 103b to the location server 109 and from the location server 109 to the privacy server 111, or from the mobile device 103b to the broadcast server 101 and from the broadcast server 101 to the privacy server 111, at step 417. Upon receipt of the opt-in message, the privacy server 111 stores the device identifier of the mobile device 103b in the database of identifiers for mobile devices having opted-in to location-based broadcast messaging services and to the associated privacy policy (step 419).

FIG. 4E illustratively shows a flow diagram for an additional or alternative process for pushing a location agent application onto a mobile device 103a. The process begins at step 431, with the broadcast server 101 receiving a request to push a location agent onto one or more client devices, the request message including identifiers (e.g., MDNs) for each of the client devices. For each identified mobile device, the broadcast server 101 sends a location agent query message (step 432) to the location server 109, to determine whether the location server 109 or the associated mobile device 103a has a location agent installed. The broadcast server 101 receives a location agent response message from the location server 109 (step 433), the response message indicating whether or not a location agent is installed. If the broadcast server 101 determines that no location agent is installed, the broadcast server 101 sends a request to push a location agent to the location server 109 (step 434). The request includes an identifier for the target device, such as a MDN. The request is forwarded by the location server 109 to a software repository server (step 435), and the software repository server sends a command to the mobile device 103a to download a location agent installation file (step 436). The command may include a URL or other address or information for use in downloading the location agent installation file. In response to the command, the mobile device 103a downloads the location agent installation file from the repository server (step 437). The mobile device 103a installs the location agent (step 438) and, as part of the installation, displays for review to the user of the device a privacy policy (step 439). If the user reviews and accepts the privacy policy, the mobile device 103a sends an opt-in message via the location server 109 to the broadcast server 101 and/or the privacy server 111 (steps 440, 441). Upon receipt of the opt-in message containing an identifier for the mobile device (such as a MDN), the privacy server 111 stores the device identifier of the mobile device 103a in the database of identifiers for mobile devices having opted-in to location-based broadcast messaging services and to the associated privacy policy (step 442). A confirmation message identifying each mobile device the location agent was installed onto may be sent to the business application server 105, to confirm installation of the location agent 107 and opt-in by the mobile device 103a (step 443). While FIG. 4E shows a process for pushing a location agent on a mobile device 103a configured to run a location agent 107a, a similar procedure may be used to push a location agent 107b associated with a mobile device 103b onto a location server 109, for example by modifying steps 436, 437, and 438 to cause the location agent installation file to be downloaded and installed onto the location server 109.

Figure 5:
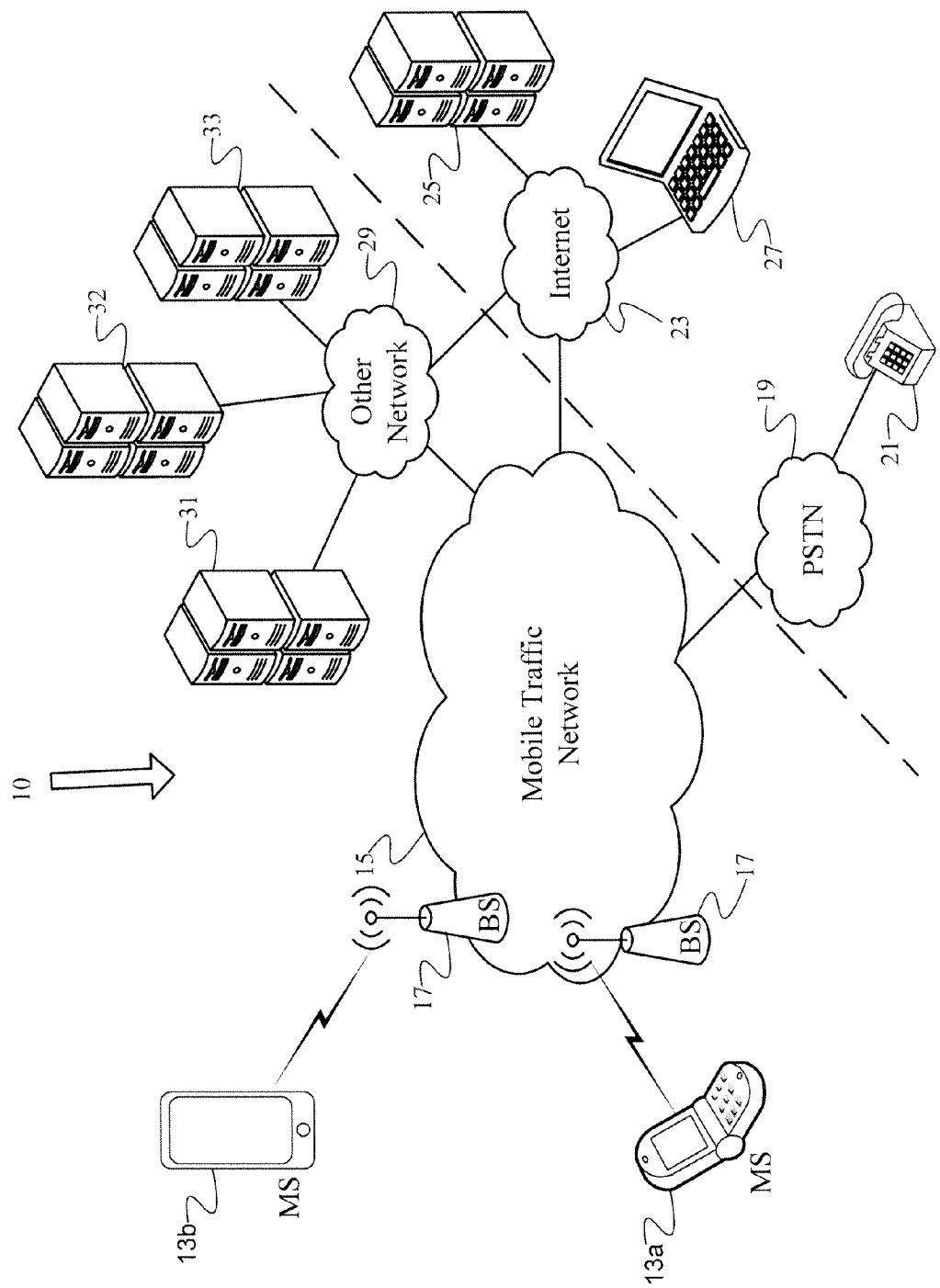
FIG. 5 is a high-level functional block diagram of an example of a system of networks/devices that provide various communications for mobile devices and support an example of the location-based broadcast messaging service.

FIG. 5 illustrates a system 10 offering a variety of mobile communication services, including communication services for providing location-based broadcast messaging services to mobile device users. The example shows simply two mobile devices 13a and 13b as well as a mobile traffic network 15. The devices 13a and 13b are examples of mobile devices that may be used for the location-based broadcast messaging service. However, the network will provide similar communications for many other similar users as well as for mobile devices/users that do not participate in the location-based broadcast messaging service. The network 15 provides mobile wireless communications and data services to those devices as well as to other mobile devices (not shown), for example, via a number of base stations (BSs) 17. The present techniques may be implemented in any of a variety of available mobile networks 15 and/or on any type of mobile device compatible with such a network 15, and the drawing shows only a very simplified example of a few relevant elements of the network 15 for purposes of discussion here.

The wireless mobile traffic network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile devices 13 may be capable of voice telephone communications through the network 15, and for the location-based broadcast messaging services, the exemplary devices 13a and 13b are capable of messaging communications through the particular type of network 15 (and the users thereof typically will have subscribed to messaging service through the network).

The network 15 allows users of the mobile devices such as 13a and 13b (and other mobile devices not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile devices 13 via the Internet 23 may be with devices like those shown at 25 and 27 as well as with a variety of other types of devices or systems capable of data communications through various interconnected networks. The mobile devices 13a and 13b of users of the location-based broadcast messaging service also can receive and execute applications written in various programming languages, as discussed in more detail later.

Mobile devices 13 can take the form of portable handsets, smart-phones or personal digital assistants, although they may be implemented in other form factors. Program applications, including an application to assist in the location-based broadcast messaging service can be configured to execute on many different types of mobile devices 13. For example, a mobile device application can be written to execute on a binary runtime environment for mobile (BREW-based) mobile device, a Windows Mobile based mobile device, Android, I-Phone, Java Mobile, or RIM based mobile device such as a BlackBerry or the like. Some of these types of devices can employ a multi-tasking operating system. Some mobile devices 13 may not execute all or part of the program applications used to assist in the location-based broadcast messaging service, and may instead rely on a location server (e.g., location server 32) to execute at least part of the program applications.

The mobile traffic network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile devices 13, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile devices 13, when the mobile devices are within range. Each base station can include a BTS coupled to several antennae mounted on a radio tower within a coverage area often referred to as a "cell." The BTS is the part of the radio network that sends and receives RF signals to/from the mobile devices 13 that are served by the base station 17.

The radio access networks can also include a traffic network represented generally by the cloud at 15, which carries the user communications and data for the mobile devices 13 between the base stations 17 and other elements with or through which the mobile devices communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here for simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more broadcast messaging application servers 31, a related privacy server 33 for the location-based broadcast messaging service of server 31, and one or more location servers 32.

A mobile device 13 communicates over the air with a base station 17 and through the traffic network 15 for various voice and data communications, e.g. through the Internet 23 with a server 25 and/or with application servers 31. If the mobile service carrier offers the location-based broadcast messaging service, the service may be hosted on a carrier operated application server 31, for communication via the networks 15 and 29. Alternatively, the location-based broadcast messaging service may be provided by a separate entity (alone or through agreements with the carrier), in which case, the service may be hosted on an application server such as server 25 connected for communication via the networks 15 and 23. Server such as 25 and 31 may provide any of a variety of common application or service functions in support of or in addition to an application program running on the mobile device 13. In one example, server 25 is a business application server used for transmitting a broadcast request to broadcast messaging server 31. However, for purposes of further discussion, we will focus on functions thereof in support of the mobile location-based broadcast messaging service.

To insure that the application service offered by server 31 is available to only authorized devices/users, the provider of the application service also deploys a privacy server 33. The privacy server 33 could be a separate physical server as shown, or privacy server 33 could be implemented as another program module running on the same hardware platform as the broadcast messaging application server 31. Essentially, when the server application (server 31 in our example) receives a service request from a user on terminal 27, the server application provides appropriate information including a list of target mobile device identifiers to the privacy server 33 to allow server application 33 to confirm the opt-in status of the target mobile devices 13 as outlined herein. Upon successful confirmation, the server 33 informs the broadcast messaging server application 31, which in turn provides the broadcast messaging service via data communication through the various communication elements (e.g. 29, 15 and 17) of the network 10. A similar confirmation function may be provided for location-based broadcast messaging service(s) offered via the server 25, either by the server 33 if there is an appropriate arrangement between the carrier and the operator of server 25, by a program on the server 25 or via a separate authentication server (not shown) connected to the Internet 23.

One or more location servers 32 may be configured to execute location agent or other programming to provide or support providing of location-based broadcast messaging services on some mobile devices 13. The location servers 32 can be separate physical servers, as shown, or could be implemented as a program module running on server 31 and/or server 33. In the example shown, location server 32 communicates with a respective mobile device 13 through networks 10 and 29. Alternatively, location server functionality may be hosted on an application server such as server 25 connected for communication via the networks 15 and 23.

The enhanced location-based broadcast messaging service under consideration here may be delivered to touch screen type mobile devices 13b as well as to non-touch type mobile devices 13a. Implementation of the location-based broadcast messaging service will involve at least some execution of programming in the mobile device as well as implementation of user input/output functions and data communications through the network 15, from the mobile devices.

Figure 6:
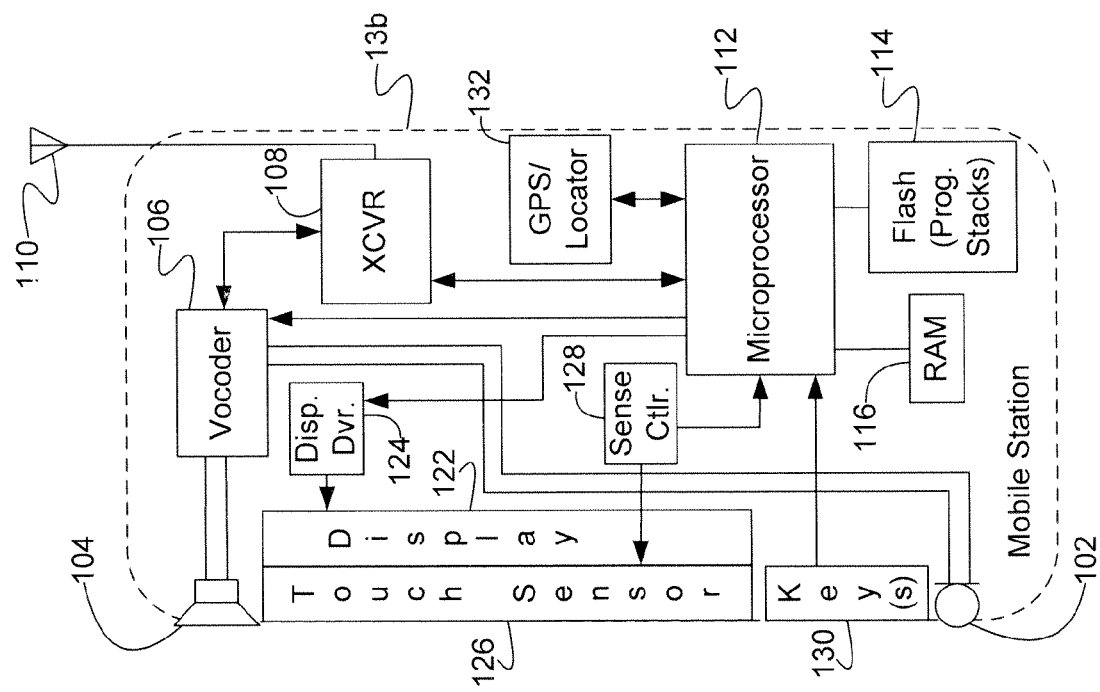
FIG. 6 is a high-level functional block diagram of an exemplary touch screen type mobile device as may utilize the location-based broadcast messaging service through a network/system like that shown in FIG. 5.

Those skilled in the art presumably are familiar with the structure, programming and operations of various types of mobile devices. However, for completeness, it may be useful to consider the functional elements/aspects of an exemplary mobile device 13b, at a high-level. FIG. 6 provides a block diagram illustration of an exemplary touch screen type mobile device 13b. The touch screen type mobile device 13b includes a microphone 102, speaker 104 and vocoder 106, for audio input and output functions. The mobile device 13b also includes at least one digital transceiver (XCVR) 108, for digital wireless communications, although the handset 13b may include an additional digital or analog transceiver. The concepts discussed here encompass embodiments of the mobile device 13b utilizing any digital transceivers that conform to current or future developed digital wireless communication standards. The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile device 13b and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

A microprocessor 112 serves as a programmable controller for the mobile device 13b, in that it controls all operations of the mobile device 13b in accord with programming that it executes, for all normal operations, and for operations involved in the location-based broadcast messaging procedure under consideration here. In the example, the mobile device 13b includes flash type program memory 114, for storage of various program routines and mobile configuration settings. The mobile device 13b may also include a non-volatile random access memory (RAM) 116 for a working data processing memory. Of course, other storage devices or configurations may be added to or substituted for those in the example. Hence, outlined above, the mobile device 13b includes a processor, and programming stored in the flash memory 114 configures the processor so that the mobile device is capable of performing various desired functions, including in this case the functions involved in the technique for providing location-based broadcast messaging. The mobile device 13b can optionally include circuitry for assisting in determining the current location of the mobile device 13b, such as GPS/locator circuitry 132. GPS/locator circuitry 132 can include a GPS or assisted-GPS receiver, GPS or assisted-GPS processor, circuitry to assist or perform location triangulation, or the like. In one example, the locator circuitry may include circuitry to perform triangulation, to determine a location of mobile device 13b based on communication and communication delays with multiple base stations 17. The GPS/locator circuitry 132 is in communication with processor 112, and can provide processor 112 with current location information for mobile device 13b or with information for determining the current location of mobile device 13b. In some example, GPS/locator circuitry is alternatively or additionally included as part communication network 10, for example as part of one or more base stations 17, one or more location server(s) 32, and/or mobile traffic network 15.

The mobile device 13b may include a user interface including a limited number of key(s) 130, a display 122, a touch/ position sensor 126, a microphone 102, and a speaker 104. The display 122, which the microprocessor 112 controls via a display driver 124, and touch/position sensor 126 provide touchscreen functionality to display information to a user and detect occurrence and location of a touch on the area of the display. A sense circuit 128 sensing signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

As outlined above, the location agent function may be implemented by appropriate programming of a mobile device. The description of FIG. 6 relates to an example of a suitable mobile device 13b. In the example, the location agent is stored as instructions in program memory 114, and configured for execution on microprocessor 112. Upon receiving a geo-location query on mobile device 13b, the instructions cause microprocessor 112 to determine and/or monitor a current location of the mobile device based on location data received from GPS/locator circuitry 132, to compare the current location to an area identified in the geo-location query, to generate and send a geo-location response message if the comparison results in a match, and to display the received broadcast message on display 122.

For some mobile devices, however, at least part of the location agent functionality is implemented on a server, such as on location server 32. In such mobile devices, the location server 32 may perform one or more functions of the location agent 107b. The location server 32 may receive information to determine a current location of the mobile device 103b from the mobile device, from one or more base stations 17, and/or from other location determining means, and send a geo-location response message to the broadcast server if the current location matches an area or satisfies a requirement related to a geo-location query. Mobile device 13b may nonetheless be configured to display the broadcast message on a display 122 when the broadcast message is received from the broadcast server. Other functions of the location-based messaging service are implemented by programming of other servers.

Hence, a number of functions relating to the location-based broadcast messaging service may be implemented on computers connected for data communication via the components of a packet data network, operating as a broadcast server and/or as an location server as shown in FIG. 5. Although special purpose devices may be used, such devices also may be implemented using one or more hardware platforms intended to represent a general class of data processing device commonly used to run "server" programming so as to implement the broadcast, privacy, and location server functions discussed above, albeit with an appropriate network connection for data communication.

The software functionalities involve programming, including executable code as well as associated stored data, e.g. files used for the location-based broadcast messaging service. The software code is executable by the general-purpose computer that functions as the broadcast, privacy, and/or location server, or as the business application server. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for location-based broadcast messaging services, in essentially the manner performed in the implementations discussed and illustrated herein.

Figure 7:
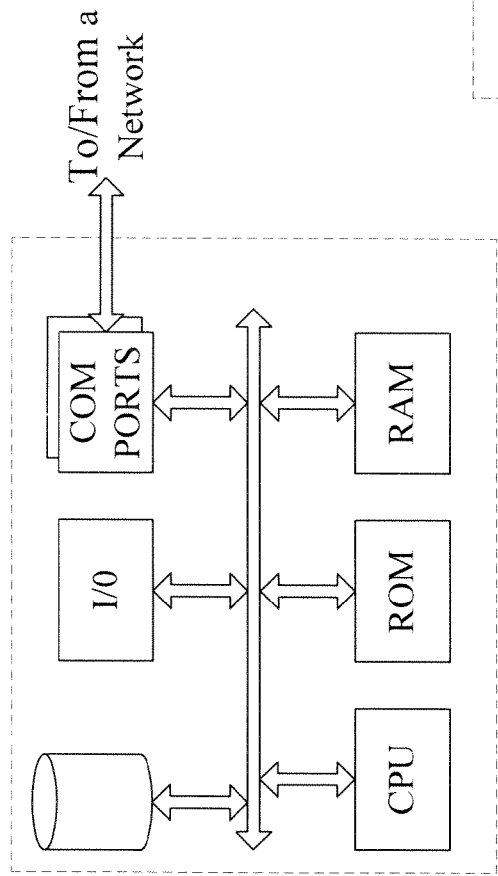
FIG. 7 is a simplified functional block diagram of a computer that may be configured as a host or server, for example, to function as any of the servers in the system of FIG. 1.
Figure 8:
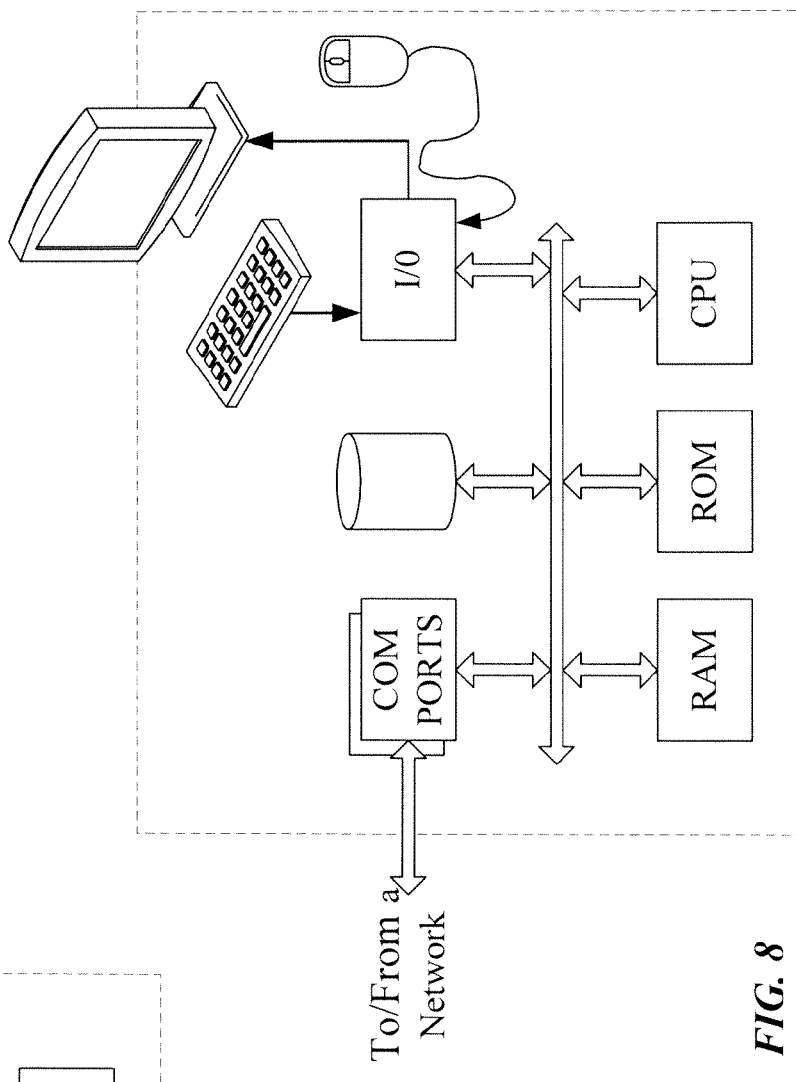
FIG. 8 is a simplified functional block diagram of a personal computer or other work station or terminal device.

FIGS. 7 and 8 provide functional block diagram illustrations of general purpose computer hardware platforms. FIG. 7 illustrates a network or host computer platform, as may typically be used to implement a server. FIG. 8 depicts a computer with user interface elements, as may be used to implement a personal computer or other type of work station or terminal device, although the computer of FIG. 8 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 8). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of location-based broadcast messaging service outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a privacy server or host computer of the service provider into the computer platform of a location server or a mobile device.

Hence, a non-transitory machine readable medium may take many forms, including but not limited to, a tangible storage medium or physical transmission medium. Non-volatile storage media include, for example, optical or magnetic disks, such as any of the storage devices in any computer(s), mobile devices, or the like that may be used to implement the location-based broadcast messaging service shown in the drawings. Volatile storage media include dynamic memory, such as main memory of such a computer platform or mobile device. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
   a broadcast server, in communication with a business application server through a communication network, configured to receive from the business application server a broadcast request including a broadcast message to be broadcast and at least one identifier for a plurality of mobile devices to which the message is to be broadcast; and
   a privacy server, in communication with the broadcast server, configured to generate a list of confirmed mobile device identifiers in response to receiving a list of identifiers of mobile devices,
   wherein in response to receiving the broadcast request, the broadcast server is further configured to:
      send to the privacy server a list of identifiers of mobile devices corresponding to the at least one identifier from the broadcast request;
      receive a list of confirmed mobile device identifiers from the privacy server, responsive to the list of identifiers sent to the privacy server;
      send a query to location agents associated with each of the mobile devices identified in the list of confirmed mobile device identifiers received from the privacy server, the query identifying a time-period and a location;
      receive a response to the query from at least one of the location agents, when the at least one of the location agents associated with at least one of the mobile devices, determines that the at least one mobile device is located in or is entering the location during the time-period; and
      transmit the broadcast message through a mobile traffic network to the mobile device associated with each location agent from which the broadcast server received a response to the query.

2. The system of claim 1, wherein the broadcast server is further configured to:
   upon transmitting the broadcast message from the broadcast request to a respective mobile device, add an identifier of the respective mobile device to a list of mobile devices having been sent the broadcast message; and send the list of mobile devices having been sent the broadcast message to the business application server.

3. The system of claim 1, wherein the broadcast server is further configured to:

upon transmitting the broadcast message from the broadcast request to a respective mobile device, add an identifier of the respective mobile device to a list of mobile devices having been sent the broadcast message; and periodically send to the business application server a delivery status message including a list of identifiers for mobile devices having been sent the broadcast message since a previous periodic delivery status message was sent to the business application server.

4. The system of claim 1, wherein:

the identifier for the location characterizes an area; and the location of a respective mobile device satisfies the requirement related to the location only if the location of the respective mobile device is within the area.

5. The system of claim 1, wherein:

the identifier for the location characterizes a boundary and specifies a direction; and the location of a respective mobile device satisfies the requirement related to the location only if the location of the respective mobile device crosses the boundary in the specified direction.

6. The system of claim 1, wherein:

the broadcast request indicates at least one time-period;

the query includes the time-period; and the broadcast server is configured to receive responses to the query only during the at least one time-period.

7. The system of claim 5, wherein the broadcast server is further configured to:

receive responses to the query from multiple location agents at a beginning of a particular time-period;

in response to receiving the responses from the multiple location agents, transmit the broadcast message to mobile devices associated with each of the multiple location agents from which the broadcast server received a response to the query at the beginning of the particular time-period;

receive a response to the query from a particular location agent after the beginning of the particular time-period; and in response to receiving the response from the particular location agent, transmit the broadcast message to a particular mobile device associated with the particular location agent after the beginning of the particular time-period.

8. The system of claim 1, wherein:

the privacy server has a database storing identifiers for mobile devices having opted in to a broadcast messaging service; and the privacy server generates the list of confirmed mobile device identifiers by identifying identifiers of the received list of identifiers that match the identifiers stored in the database of the privacy server.

9. The system of claim 1, wherein:

the location agent associated with at least one of the mobile devices identified in the list of confirmed mobile device identifiers runs on a mobile device; and the location agent associated with at least one of the mobile devices identified in the list of confirmed mobile device identifiers runs on a location server.

10. The system of claim 1, wherein:

the broadcast server is configured to receive first and second broadcast requests, each broadcast request including an indicator for a respective priority associated with the broadcast message; and the broadcast server is configured to send the list of identifiers corresponding to the broadcast request having a higher priority before sending the list of identifiers corresponding to the broadcast request having a lower priority.

11. A method, comprising steps of:

receiving a message and an identifier for a geographic location, from a business application server intending to send the message;

receiving a list of identifiers for target mobile devices to which the message is to be sent;

sending to a privacy server the list of identifiers;

receiving a list of confirmed mobile device identifiers from the privacy server, responsive to the list of identifiers sent to the privacy server;

sending a location query to a location agent associated with each target mobile device identified in the list of confirmed identifiers, the location query including the identifier for the geographic location and identifying a time-period;

receiving one or more responses to the location query indicating which of the target mobile devices satisfy a requirement related to the identified geographic location, when one or more of the location agents determine that one or more of the target mobile devices are located in or are entering the geographic location during the time-period; and transmitting the received message through a mobile traffic network only to target mobile devices indicated as satisfying the requirement related to the identified geographic location.

12. The method of claim 11, further comprising:

receiving one or more identifiers for mobile devices from the business application server intending to send the message; and sending to a privacy server a list of mobile device identifiers corresponding to the one or more identifiers for mobile devices, wherein:

the receiving the list of identifiers for target mobile devices comprises receiving from the privacy server a list of identifiers for mobile devices confirmed as having opted in to a broadcast messaging service, and the location query is sent only to location agents associated with each confirmed mobile device included in the list received from the privacy server.

13. The method of claim 11, further comprising:

sending to the business application server a confirmation message indicating a delivery status for the message, wherein the delivery status includes a list of identifiers for target mobile devices having been sent the message.

14. The method of claim 11, further comprising:

periodically sending to the business application server a confirmation message indicating a delivery status for the message, wherein the delivery status includes a list of identifiers for target mobile devices having been sent the message since a previous periodic confirmation message indicating a delivery status was sent.

15. The method of claim 11, further comprising:

receiving from the business application server an indication of a time-period associated with the message, wherein the location query sent to location agents includes the indication of the time-period.

16. The method of claim 15, wherein:

the receiving one or more responses to the location query comprises receiving one or more responses to the location query at a beginning of the time-period, the transmitting the received message comprises transmitting, in response to receiving the one or more responses, the received message only to target mobile devices indicated as satisfying the requirement related to the identified geographic location at the beginning of the particular time-period, and the method further comprises:

receiving a response to the location query from a particular location agent after the beginning of the particular time-period; and in response to receiving the response from the particular location agent, transmitting the received message to a target mobile device associated with the particular location agent after the beginning of the particular time-period.

17. The method of claim 11, wherein:

the identifier for the geographic location comprises a geographic area; and the received responses to the location query indicate which of the target mobile devices are located within the geographic area.

18. The method of claim 11, wherein:

the identifier for the geographic location comprises a boundary and specifies a direction; and the received responses to the location query indicate which of the target mobile devices have crossed the boundary in the specified direction.

19. A location agent, comprising:

a non-transitory storage device; and programming in the storage device for execution by a processor, wherein execution of the programming by the processor configures the location agent to perform functions, including functions to:

receive a location query identifying a geographic location and a time-period, through a mobile traffic network from a broadcast server, the geographic location and the time period being associated with a mobile device confirmed by a privacy server;

determine a location of the mobile device; and upon determining the location of the mobile device that the mobile device is located in or is entering the geographic location during the time-period, send a response message through the mobile traffic network to the broadcast server indicating that the mobile device satisfies the requirement related to the identified geographic location and that a broadcast message should be sent from the broadcast server to the mobile device.

20. The location agent of claim 19, wherein the programming in the storage device is for execution by a processor of the mobile device and configures the mobile device to perform the functions.

21. The location agent of claim 19, wherein the programming in the storage device is for execution by a processor of a location server associated and in communication with the mobile device, and the programming configures the location server to perform the functions.

22. The location agent of claim 19, wherein execution of the programming by the processor further configures the location agent to perform functions to:

in response to sending the response message to the broadcast server, receive from the broadcast server the mobile messaging service message associated with the identified geographic location.

23. The location agent of claim 19, wherein execution of the programming by the processor further configures the location agent to perform functions to:

display a privacy policy to a user of the mobile device; and upon the user accepting the privacy policy, send an opt-in message to a privacy server in communication with the broadcast server.

24. The location agent of claim 19, wherein:

the determining of a location of a mobile device comprises determining a current and a previous location of the mobile device; and the determining that the location of the mobile device satisfies a requirement comprises determining that the current and previous locations of the mobile device satisfy the requirement related to the identified geographic location.

* * * * *